(12) United States Patent
Bates et al.

(10) Patent No.: US 9,170,876 B1
(45) Date of Patent: Oct. 27, 2015

(54) METHOD AND SYSTEM FOR DECODING ENCODED DATA STORED IN A NON-VOLATILE MEMORY

(71) Applicant: PMC-Sierra US, Inc., Sunnyvale, CA (US)

(72) Inventors: Stephen Bates, Canmore (CA); Peter Graumann, Calgary (CA); Philip Lyon Northcott, Coquitlam (CA); Sean Gregory Gibb, Calgary (CA)

(73) Assignee: PMC-Sierra US, Inc., Sunnyvale, CA (US)

( * ) Notice: Subject to any disclaimer, the term of this patent is extended or adjusted under 35 U.S.C. 154(b) by 122 days.

(21) Appl. No.: 14/144,857

(22) Filed: Dec. 31, 2013

(51) Int. Cl.
*H03M 13/00* (2006.01)
*G06F 11/10* (2006.01)

(52) U.S. Cl.
CPC ...................................... *G06F 11/10* (2013.01)

(58) Field of Classification Search
CPC . G06F 11/10; G06F 11/1072; G06F 11/1048; G06F 11/1068; G06F 12/0246; G06F 11/108; G06F 2212/7205; G06F 2212/7208; G06F 2212/1016; G06F 11/1012; H03M 13/1108; H03M 13/6591; H03M 13/1142; H03M 13/45; H03M 13/1128; H03M 13/13; G11C 2029/0411; G11C 16/26; G11C 11/5642; G11C 16/0483; G11C 7/1006; G11C 29/52; G11C 29/028; H01L 29/7926; H01L 27/11582
See application file for complete search history.

(56) References Cited

U.S. PATENT DOCUMENTS

| 7,447,984 B2 | 11/2008 | Cameron et al. |
| 8,156,400 B1 | 4/2012 | Yeo et al. |
| 2011/0252289 A1 | 10/2011 | Patapoutian et al. |
| 2012/0317460 A1 | 12/2012 | Chilappagari et al. |

OTHER PUBLICATIONS

Shadley, "NAND Flash Media Management Through RAIN," Technical Marketing Brief, copyright 2011, Micron Technology, Inc., Boise, ID, 7 pages.
LSI Corporation, "RAISE™—Redundant Array of Independent Silicon Elements," printed Jan. 8, 2013, http://www.lsi.com/technology/duraclass/Pages/RAISE.aspx, copyright 2013, LSI Corporation, San Jose, CA, 2 pages.
Wikipedia, "RAID—Redundant Array of Independent Disks," printed on Jan. 8, 2013, http://en.wikipedia.org/wiki/RAID, 13 pages.

*Primary Examiner* — Guerrier Merant
(74) *Attorney, Agent, or Firm* — Dennis R. Haszko (57) ABSTRACT

A method of decoding a primary codeword and a set of secondary codewords stored in a non-volatile memory (NVM), which includes reading, from the NVM, the primary codeword and all the secondary codewords and storing them in a second memory. The primary codeword is then read from the second memory and decoded, utilizing a soft-decision decoder, based on a log-likelihood ratio (LLR) vector. When the decoding of the primary codeword is unsuccessful: each secondary codeword of the set of secondary codewords is read from the second memory and decoded, utilizing a hard-decision decoder, to identify and correct errored data bits in the each secondary codeword and to determine a location of each errored data bit in the primary codeword. An adjusted LLR vector is generated by adjusting the LLR for each primary codeword data bit based on the determined locations of the errored data bits in the primary codeword.

19 Claims, 8 Drawing Sheets

|  | RS CODEWORD 1 | RS CODEWORD 2 | RS CODEWORD 3 | RS CODEWORD 4 |  |
|---|---|---|---|---|---|
| LDPC CODEWORD 1 | 400 DATA | 402 DATA | 404 DATA | 406 DATA | 408 PARITY |
| LDPC CODEWORD 2 | 410 DATA | 412 DATA | 414 DATA | 416 DATA | 418 PARITY |
| LDPC CODEWORD 3 | 420 DATA | 422 DATA | 424 DATA | 426 DATA | 428 PARITY |
| LDPC CODEWORD 4 | 430 DATA | 432 DATA | 434 DATA | 436 DATA | 438 PARITY |
| LDPC CODEWORD 5 | 440 DATA | 442 DATA | 444 DATA | 446 DATA | 448 PARITY |
| LDPC CODEWORD 6 | 450 DATA | 452 DATA | 454 DATA | 456 DATA | 458 PARITY |
| LDPC CODEWORD 7 | 460 DATA | 462 DATA | 464 DATA | 466 DATA | 468 PARITY |
|  | 500 PARITY | 502 PARITY | 504 PARITY | 506 PARITY |  |

METHOD AND SYSTEM FOR DECODING ENCODED DATA STORED IN A NON-VOLATILE MEMORY

FIELD

The present disclosure relates generally to error correction. More particularly, the present disclosure relates to a method and system for decoding encoded data stored in a non-volatile memory to improve error correction performance.

BACKGROUND

Non-Volatile Memory (NVM), such as NAND flash memory, is a very popular storage medium because it allows data to be stored for some length of time. The ability to store data has enabled the information age and prompt, reliable, access to this data is one of the reasons why solid-state drives (SSDs) have become so popular in recent years. Also, Solid-state drives (SSDs) that are built using NAND flash memory are becoming more and more common as their prices decrease.

NAND flash memory, however, is not particularity reliable as a storage medium because NAND flash memory often suffers from errors. Historically, NAND flash memory suffers from two classes of errors: (1) small scale errors; and (2) large scale errors. Small scale errors add Raw Bit Error Rate (RBER) to the data stored on a storage medium. Large Scale errors comprise gross defects causing large sections of the data to be in error or erased.

For NAND flash memory, a well-known large-scale (or gross) defect is a "die-kill". A "die-kill" occurs when an entire die of the NAND flash memory becomes inoperable. All data on that die, which can be as much as 128 Gb, may be lost. A common cause of a die-kill is a charge pump failure in the circuitry of the NAND flash memory. The probability of "die kill" error is estimated to be a few parts per million (PPM).

Because NVMs are never error free, to ensure data that is stored on the NVM is reliably protected, a NVM controller must implement a robust error correcting code (EEC) method. As errors can be small scale and/or large scale, it is advantageous to utilize a combination of ECC methods to protect against both small scale and large scale errors.

Improvements ECCs for NVMs are therefore desirable.

BRIEF DESCRIPTION OF THE DRAWINGS

Embodiments of the present disclosure will be described, by way of example, with reference to the drawings and to the following description, in which.

DETAILED DESCRIPTION

According to one aspect, there is provided a method of decoding a primary codeword and a set of secondary codewords stored in a first memory. The method includes storing, in a first memory, a primary codeword and a set of secondary codewords. The primary codeword includes primary codeword data bits. Each secondary codeword of the set of secondary codewords includes data bits. The data bits of each secondary codeword are a subset of the primary codeword data bits. The method also includes reading, from a second memory such as an NVM, the primary codeword, and decoding the primary codeword, utilizing a soft-decision decoder, based on a log-likelihood ratio (LLR) vector comprising a LLR for each primary codeword data bit. In response to determining that the decoding of the primary codeword is unsuccessful, the method includes: (i) reading, from the second memory, a secondary codeword of the set of secondary codewords; (ii) decoding the secondary codeword, utilizing a hard-decision decoder, to identify and correct errored data bits in the secondary codeword and to determine a location of each errored data bit in the primary codeword; (iii) repeating steps (i) and (ii) for all of the secondary codewords in the set of secondary codewords; and (iv) generating an adjusted LLR vector by adjusting the LLR for each primary codeword data bit based on the determined locations of the errored data bits in the primary codeword.

In another aspect, adjusting a LLR for each primary codeword data bit may include increasing the LLR for each primary codeword data bit at the determined locations of the errored data bits. In still another aspect, adjusting a LLR for each primary codeword data bit may also include decreasing the LLR for each primary codeword data bit not at the determined locations of the errored data bits.

In another aspect, the method may also include decoding the primary codeword, utilizing the soft-decision decoder, based on the adjusted LLR vector, and in response to determining that the decoding of the primary codeword is unsuccessful, repeating steps (i)-(vi) until the decoding of the primary codeword based on the adjusted LLRs is successful or a number of iterations exceeds a predetermined value.

In another aspect, the primary codeword may be a low-density parity-check (LDPC) codeword. In still another aspect, each secondary codeword in the set of secondary codewords may be a Reed-Solomon (RS) codeword. In still another aspect, each secondary codeword in the set of secondary codewords may be an erasure codeword. In another aspect, the method may also include decoding the erasure codeword, utilizing the hard-decision decoder, to identify erased data bits in the erasure codeword and to determine a location of each erased data bit in the primary codeword, and wherein generating an adjusted LLR vector further comprises setting the LLR to zero for each primary codeword data bit at the locations the erased data bits.

In another aspect, the method may also include reading from a second memory, the primary codeword and the set of secondary codewords, the second memory being a non-volatile memory.

In another aspect, there is provided a system that includes a first memory that stores a primary codeword and a set of secondary codewords. The primary codeword includes primary codeword data bits, and each secondary codeword of the set of secondary codewords includes data bits. The data bits of each secondary codeword are a subset of the primary codeword data bits. The system also includes a processor operably coupled to the memory and configured to read, from the memory, the primary codeword; and decode the primary codeword, utilizing a soft-decision decoder, based on a log-likelihood ratio (LLR) vector comprising a LLR for each primary codeword data bit. In response to a determination that the decoding of the primary codeword is unsuccessful, the processor (i) reads, from the memory, a secondary codeword of the set of secondary codewords; (ii) decodes the secondary codeword, utilizing a hard-decision decoder, to identify and correct errored data bits in the secondary codeword and to determine a location of each errored data bit in the primary codeword; (iii) repeats steps (i) and (ii) for all the secondary codewords in the set of secondary codewords; and (iv) generates an adjusted LLR vector by adjusting the LLR for each primary codeword data bit based on the determined locations of the errored data bits in the primary codeword.

In another aspect, the system also includes a second memory storing the primary codeword and the set of secondary codewords, and a second memory reader. The second memory may be a non-volatile memory, and the second memory reader may be a non-volatile memory reader. The second memory reader is operably coupled to the second memory and the first memory and the second memory reader may be configured to read the primary codeword and the secondary codeword from the second memory and store the primary codeword and the set of secondary codewords in the first memory.

In another aspect, the processor of the system is configured to increase the LLR for each primary codeword data bit at the determined locations of the errored data bits. In another aspect, the processor of the system is configured to decrease the LLR for each primary codeword data bit not at the determined locations of the errored data bits. In another aspect, the processor of the system is configured to: decode the primary codeword, utilizing the soft-decision decoder, based on the adjusted LLR vector, and in response to a determination that the decoding of the primary codeword is unsuccessful, repeat steps (i)-(vi) until the decoding of the primary codeword based on the adjusted log-likelihood ratios is successful or a number of iterations exceeds a predetermined value.

In another aspect, the processor of the system is configured to decode the erasure codeword, utilizing the hard-decision decoder, to identify erased data bits in the erasure codeword and to determine a location of each erased data bit in the primary codeword, and set the LLR to zero for each primary codeword data bit at the locations the erased data bits.

Other aspects and features of the present disclosure will become apparent to those ordinarily skilled in the art upon review of the following description of specific embodiments in conjunction with the accompanying figures.

The present disclosure relates to a method and system for decoding encoded data stored in a non-volatile memory to improve error correction performance.

Figure 1:
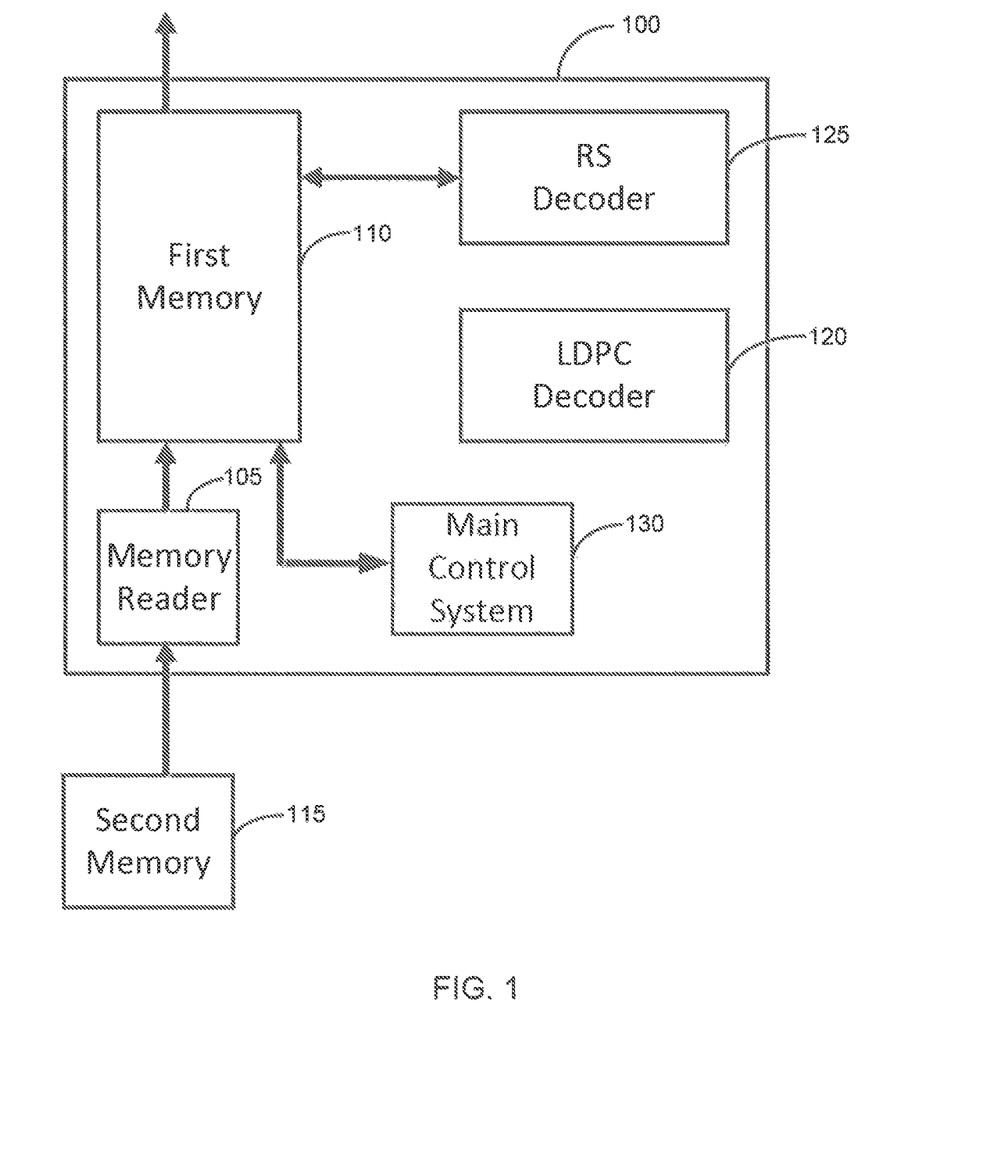
FIG. 1 is a block diagram of a RS LDPC decoder in accordance with an embodiment of the present disclosure.

A block diagram of an RS-LDPC decoder 100 in accordance with an embodiment of the present disclosure is shown in FIG. 1. The RS-LDPC decoder 100 includes a memory reader 105, a first memory 110 that stores input data received from a second memory 115, a LDPC decoder 120, a RS decoder 125, and a main controller 130. The second memory 115 may be a non-volatile memory (NVM). The first reader 105 reads input data, which is in the form of zeros (0s) and ones (1s), from the second memory 115, utilizing a known interface standard, such as, for example, an interface that is compliant with the Open NAND Flash Interface (ONFI) standard, the Toggle standard or the Double Data Rate (DDR) standard. The memory reader 105 sends the input data to the first memory 110 where the input data is stored. The input data that is stored in the first memory 110 may be accessed by both the LDPC decoder 120 and the RS decoder 125.

Log-Likelihood Ratios

Many soft-decision error-correcting codes (ECCs), including LDPC codes, use Log-Likelihood Ratios (LLRs) to represent soft-information and adjust LLRs in such a way as to perform good error correction. When a soft-decision decoder is utilized, an input to the soft-decision decoder may be a vector of LLRs that are adjusted inside the soft-decision decoder. The adjusted vector of LLRs may then be output from the soft-decision decoder, where the adjusted vector of LLRs may either be passed to another block as soft-information, or "sliced" back into hard decision data bits (i.e. 0s and 1s).

Each LLR of the vector of LLRs is associated with a hard decision data bit based on the sign of the LLR. The sign of the LLR determines whether the hard decision data bit is a 0 (positive LLR) or a 1 (negative LLR). The magnitude of the LLR represents the confidence that the hard decision data bit is correct. A larger magnitude implies more confidence. For example, an LLR of +10 denotes that a hard decision data bit is likely a zero (0) with high confidence; an LLR of −2 denotes that a hard decision data bit is likely a one (1) with low confidence. An LLR of 0 denotes that we have no confidence that the hard decision data bit is either a one (1) or a zero (0). A LLR is determined utilizing the following equation:

$$L=\log(P(x=0)/P(x=1))$$

where $P(x=0)$ is the probability that the hard decision data bit is a zero (0), and $P(x=1)$ is the probability that the hard decision data bit is a one (1).

Figure 2:
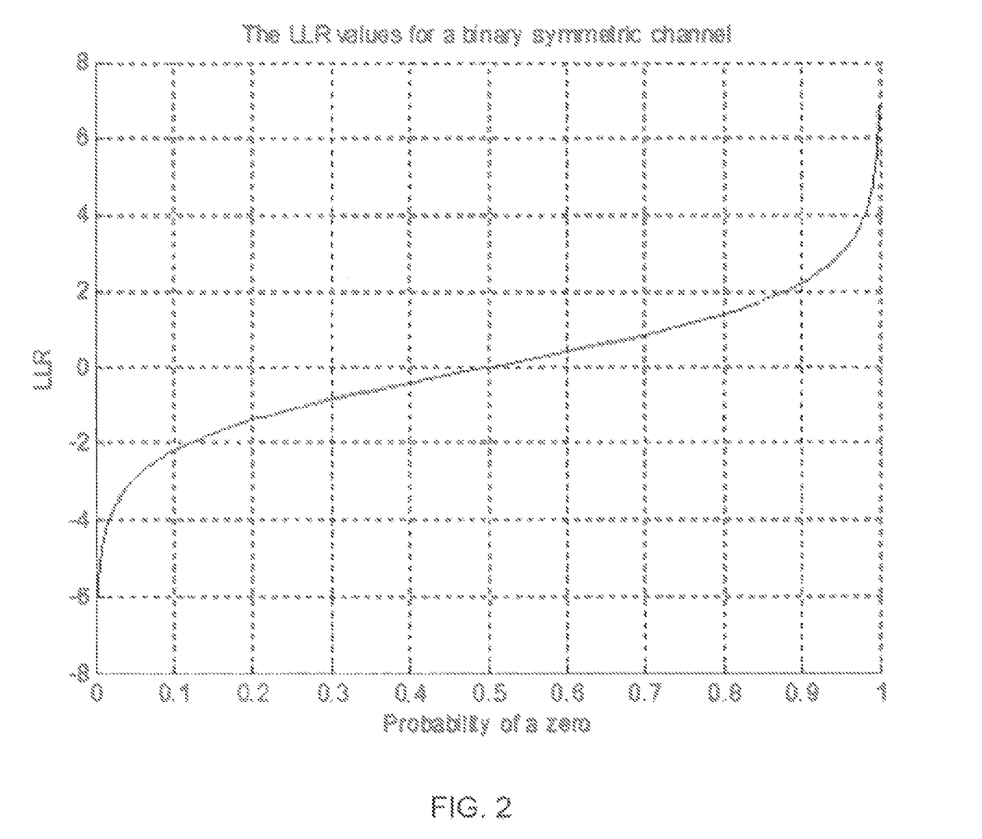
FIG. 2 is a graph illustrating a log-likelihood ratio for a Binary Symmetric Channel in accordance with an embodiment of the present disclosure.

As an example, the LLR values of a Binary Symmetric Channel (BSC) for a range of probabilities from zero (0) to one (1) are shown in FIG. 2. As shown in FIG. 2, when the probability of transmission of a hard decision data bit that is a zero (0) is 0.5, the BSC becomes a "coin-toss" and the corresponding LLR is zero (0).

A soft-decision decoder that utilizes LLRs receives a vector of LLRs, adjusts the received LLRs, and generates a new vector of LLRs with fewer errors than the input vector of LLRs. This implies that the soft-decision decoder will flip the sign of at least some of the LLRs as this causes zeros (0s) to become ones (1s) and vice-versa. Also, altering the magnitude of the LLRs has an impact on the decoding of data by the soft-decision decoder because a soft-decision decoder that utilizes LLRs will utilize high confidence LLRs and try to ignore low confidence LLRs when decoding data.

Figure 3:
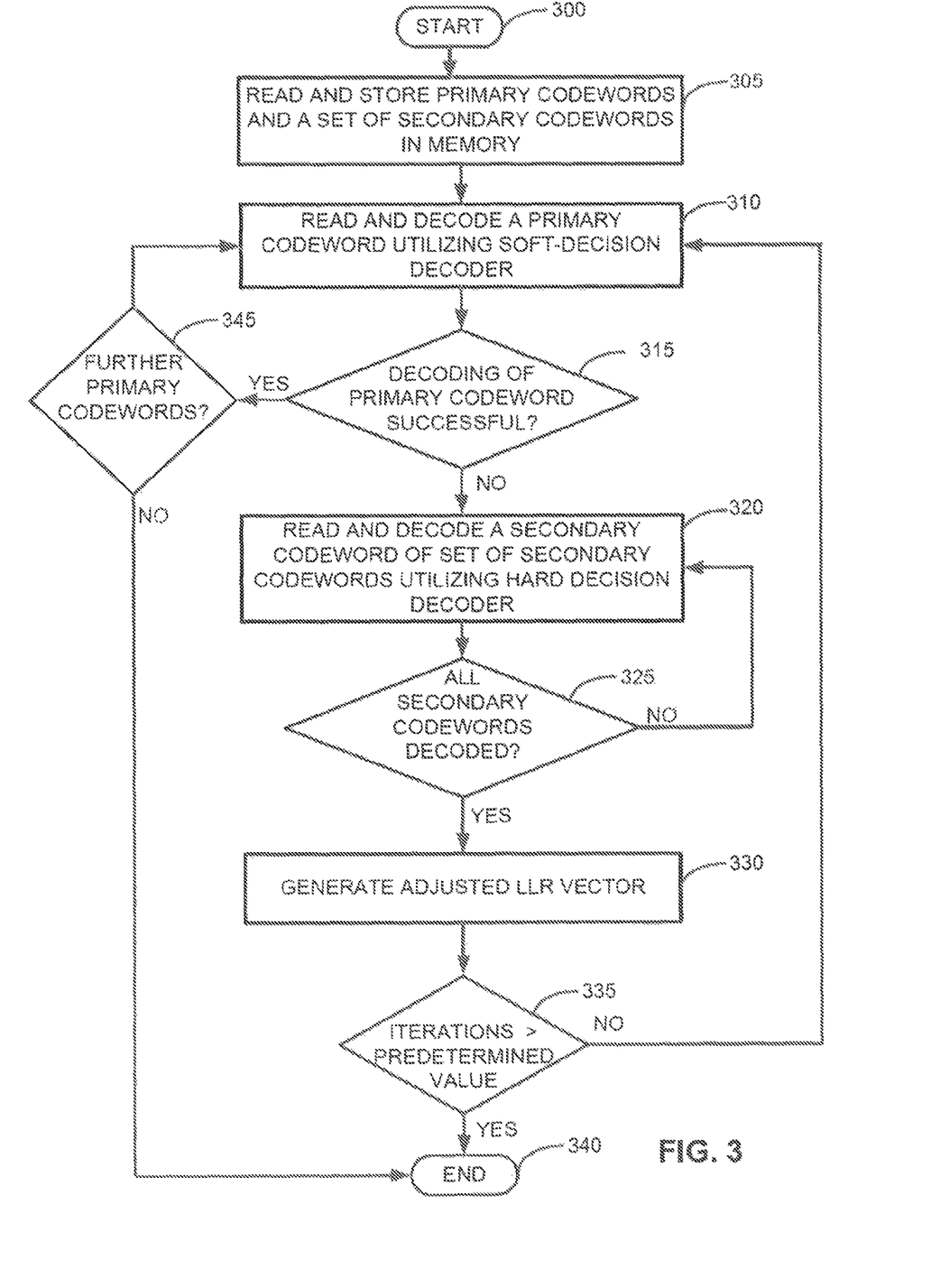
FIG. 3 is a flowchart of a method of decoding encoded data stored in a first memory in accordance with an embodiment of the present disclosure.

A method of decoding encoded data stored in a memory in accordance with an embodiment of the present disclosure will now be described with reference to FIG. 1 and FIG. 3. In an embodiment, the encoded data stored in the second memory 115 includes multiple primary codewords and a set of secondary codewords. Each primary codeword includes data bits and primary codeword parity bits, and each secondary codeword of the set of secondary codewords includes some of data bits of the primary codeword and secondary codeword parity bits. Thus, the data bits of each secondary codeword are a subset of the data bits of the primary codeword.

The method begins at 300. At 305, the primary codewords and the set of secondary codewords that are stored in the second memory 115 are read and stored in the first memory 110 utilizing the memory reader 105. The method then proceeds to 310 where a first primary codeword is decoded, utilizing a soft-decision decoder, such as based on a LLR vector that includes a LLR for each primary codeword data bit. In an embodiment, the soft-decision decoder is the LDPC decoder 120. The method then proceeds to 315. At 315, a determination is made whether the decoding of the primary codeword is successful.

When it is determined at 315 that the decoding of the primary codeword is unsuccessful, the method proceeds to 320. At 320, in a first iteration, a first secondary codeword of the set of secondary codewords is read from the first memory 110 by a hard decision decoder. The first secondary codeword is decoded, utilizing the hard-decision decoder, to identify and correct errored data bits in the secondary codeword, and to determine a location of each errored data bit in the primary codeword. In an embodiment, the hard-decision decoder is the Reed-Solomon (RS) decoder 125. The method then proceeds to 325.

At 325, a determination is made whether all the secondary codewords in the set of codewords have been decoded. When it is determined at 325 that all the secondary codewords in the set of codewords have not been decoded, the method returns to 320, and a subsequent secondary codeword of the set of secondary codewords is read from the first memory 110 by the hard decision decoder; the subsequent secondary codeword is decoded, utilizing the hard-decision decoder, to identify and correct errored data bits in the subsequent secondary codeword and to determine a location of each errored data bit in the primary codeword. The method then returns to 325, where a determination is made whether all the secondary codewords in the set of codewords have been decoded. Again, when it is determined at 325 that all the secondary codewords in the set of codewords have not been decoded, the method returns to 320. Steps 320 and 325 are repeated until all the secondary codewords in the set of codewords have been decoded.

When it is determined at 325 that all the secondary codewords in the set of codewords have been decoded, the decoded set of secondary codewords is stored in the first memory 110 and the method proceeds to 330. At 330, an adjusted LLR vector is generated by adjusting the LLR for each primary codeword data bit based on the determined locations of the errored data bits in the primary codeword. The LLR may be adjusted by either increasing or decreasing the LLR for each primary codeword data bit at the determined locations of the errored data bits. The method then proceeds to 335.

In an embodiment, a number of iterations of decoding the primary codeword may be tracked utilizing, for example, a counter. In this embodiment, at 335, a determination is made whether a number of iterations of decoding of the primary codeword, utilizing the soft-decision decoder, is greater than a predetermined number of iterations. When the number of iterations of decoding the primary codeword is less than the predetermined number of iterations, the method returns to 310, and the steps 315, 320, 325, 330, and 335 are repeated utilizing the adjusted LLR vector that is generated in step 330. Otherwise, the method proceeds to 340, where the method ends.

At 315, when the decoding of the primary codeword is successful, the method proceeds to 345. At 345, a determination is made whether further primary codewords are stored in the first memory 110. When further primary codewords are stored in the first memory 110 at 345, the method returns to 310, where a subsequent primary codeword is decoded, utilizing the soft-decision decoder, based on a LLR vector that includes a LLR for each primary codeword data bit. The method then proceeds to 315, where a determination is made whether the decoding of the subsequent primary codeword is successful.

When the decoding of the decoding of the subsequent primary codeword is successful at 315, the method returns to 345. Steps 315, 310, and 345 are repeated for all primary codewords stored in the first memory 110.

When further primary codewords are not stored in the first memory 110 at 345, the method proceeds to 340 where the method ends.

An example of the method of the present disclosure will now be described with reference to FIG. 3, FIG. 4, FIG. 5, and FIG. 6, which logically illustrate coverage of data stored in a non-volatile memory by both a set of RS codewords and a set of LDPC codewords.

In the present example, bits stored in the second memory 115 are encoded utilizing seven primary codewords and four secondary codewords. The primary codewords are LDPC codewords and the secondary codewords are RS codewords. Each LDPC codeword includes data bits and LDPC parity bits, and each RS codeword of the set of RS codewords includes some data bits of the LDPC codeword and RS parity bits. Thus, all the data bits of the LDPC codeword are included in the set of RS codewords. In other examples, a different number of codewords of each type may be used.

Figure 4:
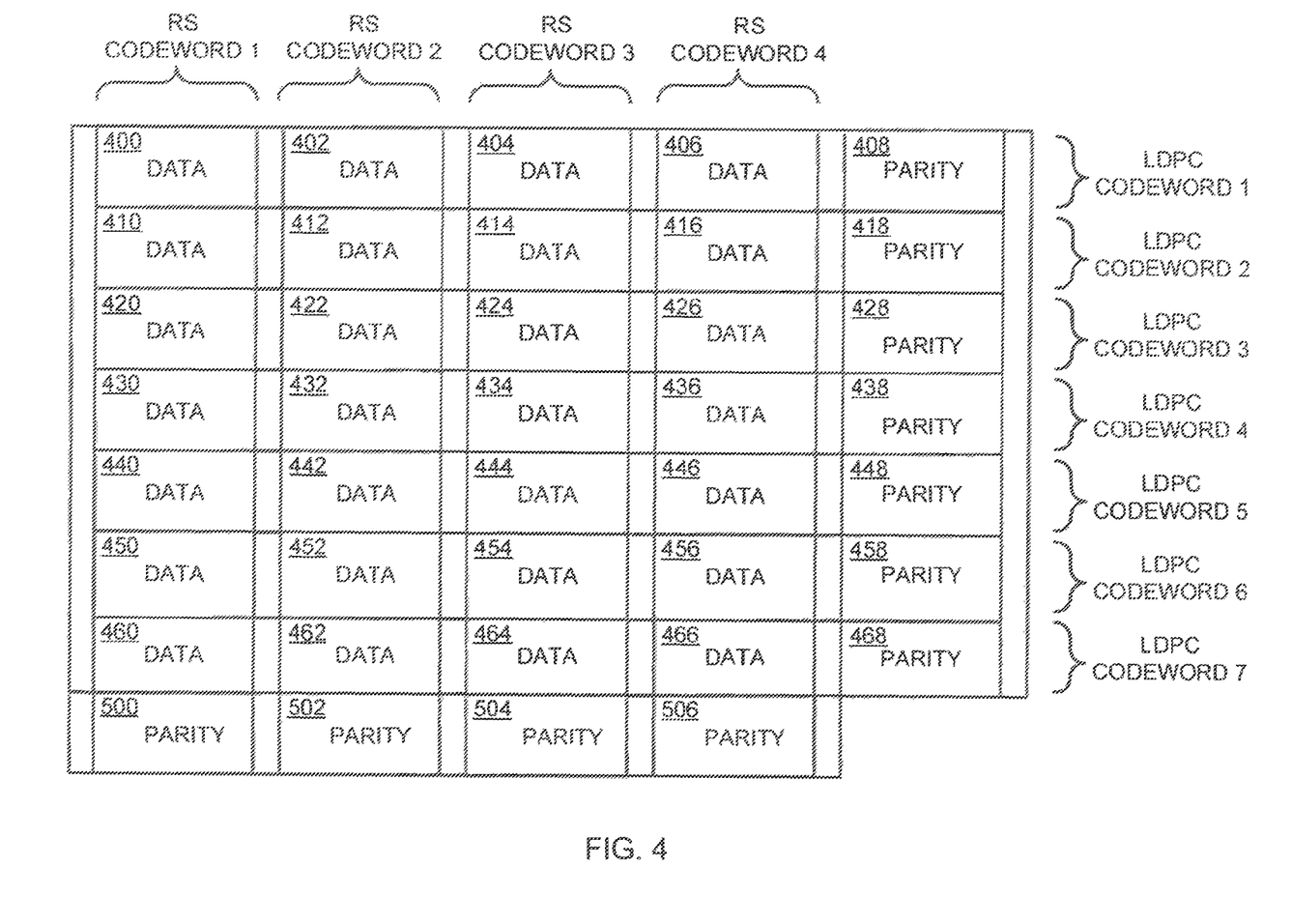
FIG. 4 is a diagram logically illustrating a set of LDPC codewords and a set of RS codewords stored in a memory in accordance with an embodiment of the present disclosure.

Referring to FIG. 1, FIG. 3, FIG. 4, FIG. 5, FIG. 6, and FIG. 7, the method begins at 300. At 305, the seven LDPC Codewords that are stored in the second memory 115 are read and stored in the first memory 110. As shown in FIG. 4, the seven LDPC Codewords are stored in the memory 110 in a grid with LDPC Codeword 1 in the first row of the grid, LDPC Codeword 2 in the second row of the grid, LDPC Codeword 3 in the third row of the grid, LDPC Codeword 4 in the fourth row of the grid, LDPC Codeword 5 in the fifth row of the grid, LDPC Codeword 6 in the sixth row of the grip, and LDPC Codeword 7 in the seventh row of the grid.

LDPC Codeword 1 includes data bits 400, 402, 404, 406 and parity bits 408 Similarly, LDPC Codeword 2 includes data bits 410, 412, 414, 416 and LDPC parity bits 418, LDPC Codeword 3 includes data bits 420, 422, 424, 426, and parity bits 428, LDPC Codeword 4 includes data bits 430, 432, 434, 436, and parity bits 438, LDPC Codeword 5 includes data bits 440, 442, 444, 446 and parity bits 448, LDPC Codeword 6 includes data bits 450, 452, 454, 456 and parity bits 458, and LDPC Codeword 7 includes data bits 460, 462, 464, 466 and parity bits 468. In an embodiment, each LDPC Codeword includes a total of 10,000 data bits and 1000 parity bits. In an alternative embodiment, each LDPC Codeword may include any suitable number of data bits and parity bits.

At 305, the four RS Codewords that are stored in the NVM 115 are also read and stored in the memory 110. As shown in FIG. 4, the four RS Codewords are stored in columns in the memory 110 in the grid, with RS Codeword 1 in the first column of the grid, RS Codeword 2 in the second column of the grid, RS Codeword 3 in the third column of the grid, and RS Codeword 4 in the fourth column of the grid. RS Codeword 1 includes data bits 400, 410, 420, 430, 440, 450, 460, and RS parity bits 500. Similarly, RS Codeword 2 includes data bits 402, 412, 422, 432, 442, 452, 462, and parity bits 502, RS Codeword 3 includes data bits 404, 414, 424, 434, 444, 454, 464, and parity bits 504, and RS Codeword 4 includes data bits 406, 416, 426, 436, 446, 456, 466, and parity bits 506.

Thus, in the present example, as shown in FIG. 4, each data bit 400 through 466 is part of one LDPC Codeword and one RS Codeword. Also, each data bit 400 through 466 may be corrected by at least two different Codewords, namely one of the RS Codewords 1, 2, 3, and 4, and one of the LDPC Codewords 1, 2, 3, 4, 5, 6, and 7.

After the seven LDPC Codewords, LDPC Codeword 1 through LDPC Codeword 7, and the four RS Codewords, RS Codeword 1 through RS Codeword 4, are stored in the first memory 110, the method proceeds to 310.

Figure 5:
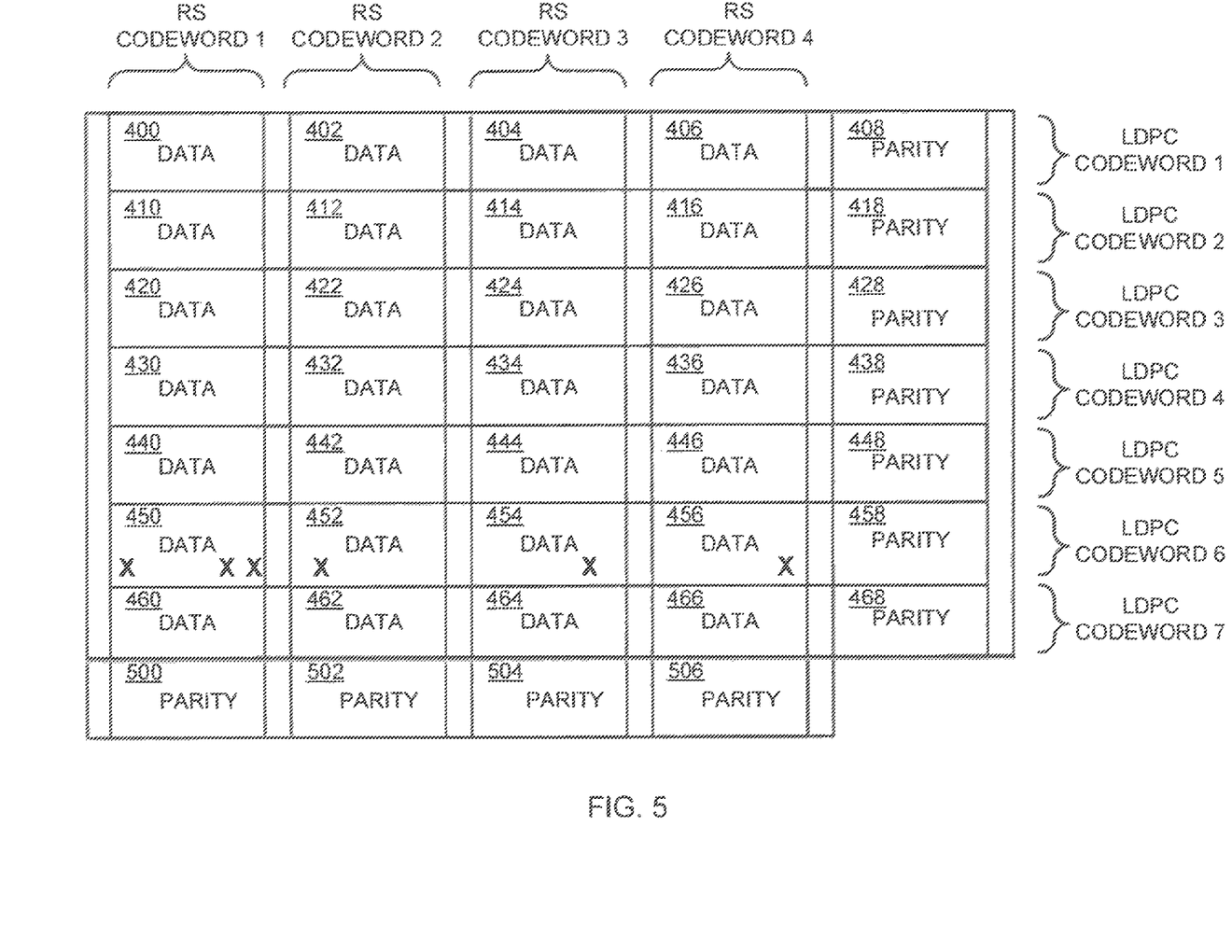
FIG. 5 is a modified version of FIG. 4, in which the data encoded by both the set of LDPC Codewords and the set of RS Codewords includes errors.

In the present example, the LDPC Codewords 1, 2, 3, 4, 5 and 7 are assumed not to have any errors, and LDPC Codeword 6 has errors in data bits 450, 452, 454, and 456. In the present example, data bit 450 has three errors and data bits 452, 454, and 456 each have one error. As shown in FIG. 5, each error is illustrated by an uppercase, bolded X. For the present example, it is assumed that the RS decoder 125 may correct RS Codewords that contain two or less errors. It is also assumed that that LDPC Codeword 6 is currently uncorrectable by the LDPC decoder 120 due to too many errors.

At 310, the LDPC decoder 120 reads the data bits 400, 402, 404, 406 and the LDPC parity bits 408 for LDPC Codeword 1 from the first memory 110 and attempts to decode LDPC Codeword 1. Because the LDPC Codeword 1 successfully decodes at 315, the method proceeds to 345. At 345, the method determines that there are further primary codewords and returns to 310.

Steps 310, 315, and 345 are repeated for LDPC Codewords 2, 3, 4, and 5. In the present example, because the LDPC Codewords 2, 3, 4, and 5 are assumed not to have any errors, each of the LDPC Codewords 2, 3, 4, and 5 successfully decode.

After LDPC Codeword 5 successfully decodes and the method determines that there are further primary codewords at 345, the method returns to 310. At 310, the LDPC decoder 120 reads the data bits 450, 452, 454, 456 and the LDPC parity bits 458 for LDPC Codeword 6 from the first memory 110 and attempts to decode LDPC Codeword 5. Because the decoding of LDPC Codeword 6 is unsuccessful, the method proceeds to 320.

In the present example, LDPC Codeword 6 is assumed to be correctable. Thus, LDPC decoder 120 stores the results of the unsuccessful decoding of LDPC Codeword 6 in the first memory 110 before proceeding to 320.

At 320, the RS decoder 125 reads the data bits 450 and the parity bits 500 for RS Codeword 1 from the first memory 110 and attempts to decode RS Codeword 1. The decoding of RS Codeword 1 is unsuccessful. The method then proceeds to 325 where a determination is made whether all the RS Codewords for the set of RS Codewords have been decoded. Because RS Codewords 2, 3, and 4 have not been decoded, the method repeats steps 320 for RS Codewords 2.

At 320, the RS decoder 125 reads the data bits 452 and the parity bits 502 for RS Codeword 2 from the first memory 110 and attempts to decode RS Codeword 2. The decoding of RS Codeword 2 is successful. The method then proceeds to 325 where a determination is made whether all the RS Codewords for the set of RS Codewords have been decoded. Because RS Codewords 3 and 4 have not been decoded, the method repeats steps 320.

Also, at 320, the RS decoder 125 reads the data bits 454 and the RS parity bits 504 for RS Codeword 3 from the first memory 110 and attempts to decode RS Codeword 3. The decoding of RS Codeword 3 is successful. The method then proceeds to 325 where a determination is made whether all the RS Codewords for the set of RS Codewords have been decoded. Because RS Codeword 4 has not been decoded, the method repeats steps 320.

At 320, the RS decoder 125 reads the data bits 466 and the RS parity bits 504 for RS Codeword 4 from the first memory 110 and attempts to decode RS Codeword 4. The decoding of RS Codeword 4 is successful. The method then proceeds to 325 where a determination is made whether all the RS Codewords for the set of RS Codewords have been decoded. Because RS Codeword 4 has been successfully decoded, the method proceeds to steps 325.

Figure 6:
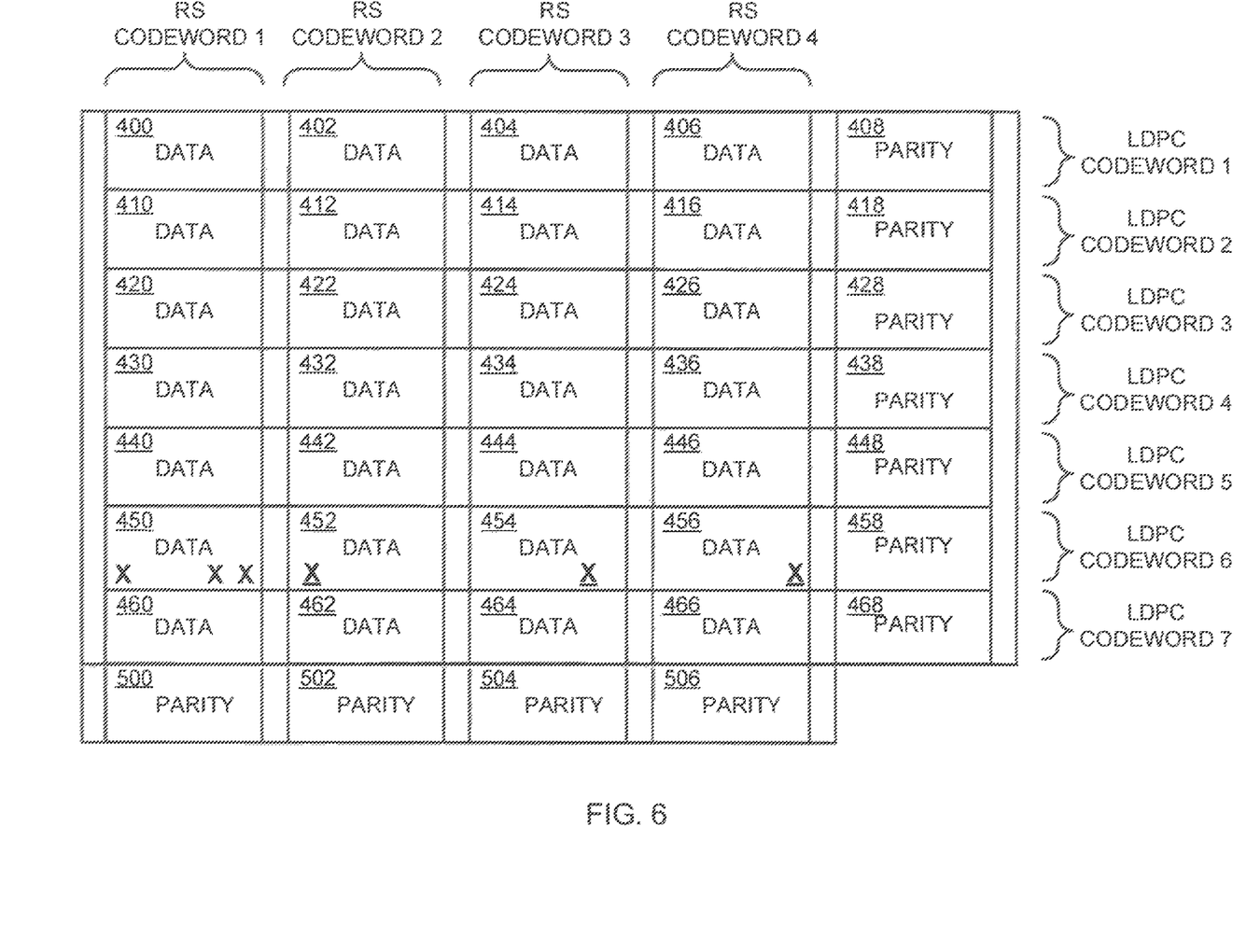
FIG. 6 is a modified version of FIG. 5, in which some of the errors in the data are corrected.

As shown in FIG. 6, the three errors in data bits 460 are not corrected by the RS decoder 125 at 320 because the data bits 460 have too many errors. Thus, each of the three errors in data bit 450 continue to be illustrated in FIG. 6 by an uppercase and bolded X. However, the errors in each data bit 452, 454, 456 are corrected by the RS decoder 125. Each corrected error bit is illustrated in FIG. 6 utilizing an uppercase, underlined, and bolded x's, (X).

After RS Codeword 4 has been successfully decoded, the method proceeds to 330. At 330, an adjusted LLR vector is generated by adjusting the LLR for each of the data bits 450, 452, 454, and 456 for RS Codewords 1, 2, 3, and 4 to improve the performance of subsequent iteration of the method of the present disclosure. In the present example, the LLRs associated with data bits 452, 454, 456 may be increased, and the LLRs associated with data bits 450 may be reduced.

The method then proceeds to 335. At 335, a determination is made whether the number of iterations for decoding LDPC Codeword 6 exceeds a predetermined value. In the present embodiment, the predetermined value may be 30. In an alternative embodiment, the predetermined value may be any number between ¼ and 100. When the number of iterations for decoding does not exceed the predetermined value, the method proceeds to 310 where the LDPC decoder 120 reads the data bits 450, 452, 454, 456 and the LDPC parity bits 458 for LDPC Codeword 6 from the first memory 110 and attempts to decode LDPC Codeword 6 utilizing the adjusted LLRs. Because the RS Codewords 2, 3, and 4 were previously successfully decoded, there are now fewer errors in LDPC Codeword 6, as shown in FIG. 6. FIG. 6 shows that data bit 450 continues to have three errors, each illustrated by an uppercase, bolded X. However, the error in each data bit 452, 454, 456 has been corrected by the RS decoder 125. The corrected errors in data bits 452, 454, 456 are each illustrated utilizing uppercase, bolded, and underlined X. Also, because the LLRs for the data bits 450, 452, 454, and 456 of LDPC Codeword 6 have been adjusted, the likelihood of successfully decoding LDPC Codeword 6 has increased.

Figure 7:
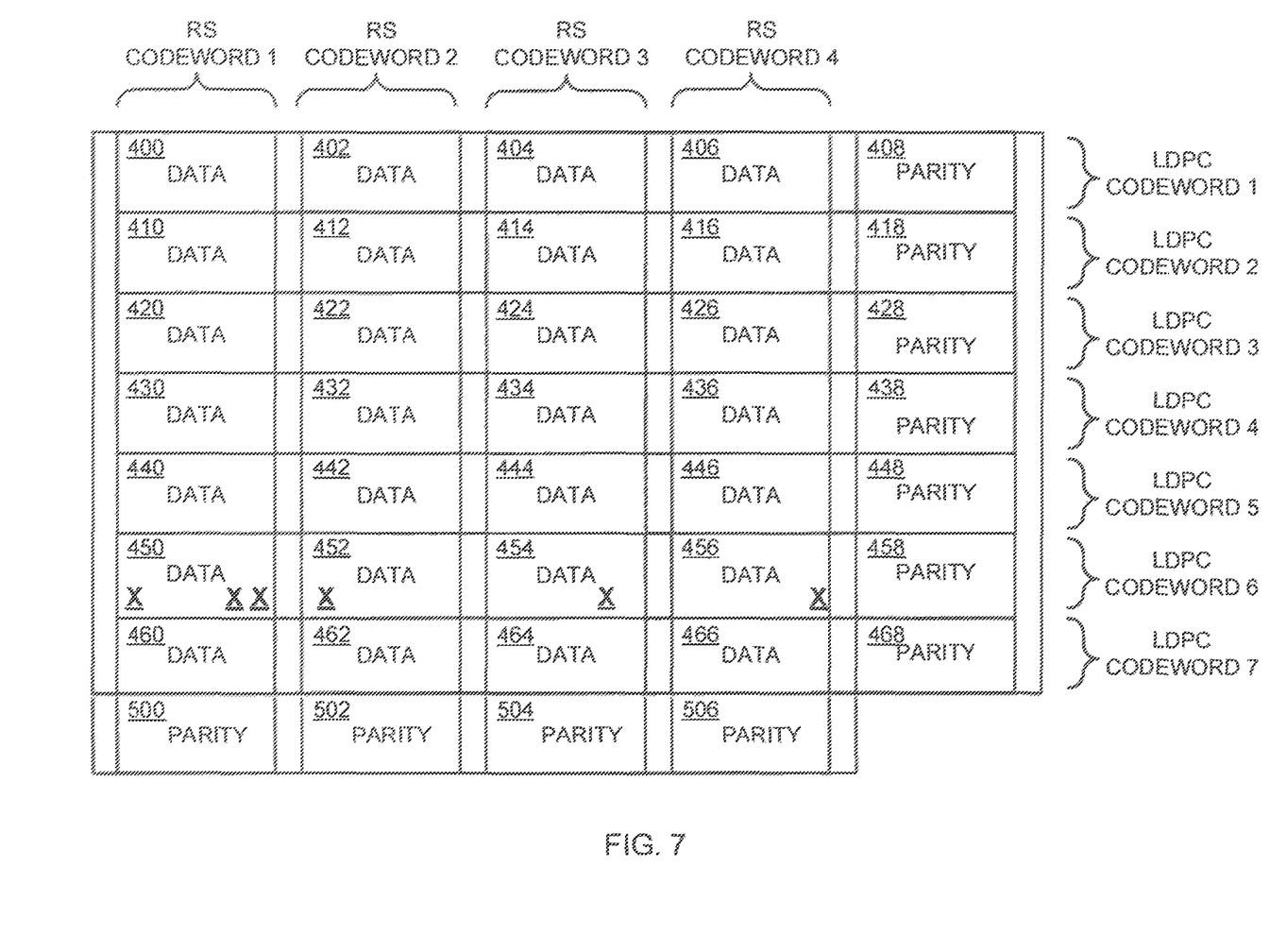
FIG. 7 is a modified version of FIG. 5, in which all of the errors in the data are corrected.

The method then proceeds to 315 where a determination is made whether the LDPC Codeword 6 successfully decoded. In the present example, it is assumed that the decoding of LDPC Codeword 6 is now successful after having adjusted the LLRs associated with the data bits 450, 452, 454, 456 of LDPC Codeword 6. The corrected bits for LDPC Codeword 6 are then stored in the first memory 110, and the main controller 130 is notified that the data bits stored in the memory first 110 are ready to be read out of the first memory 110. As shown in FIG. 7, the three error bits that are corrected in data bit 450 are each illustrated utilizing an uppercase, underlined, and bolded X.

The method then proceeds to 325 where a determination is made whether all the RS Codewords for the set of RS Codewords have been decoded. Because RS Codeword 7 has not been decoded, the method repeats steps 320. At 320, the LDPC decoder 120 reads the data bits 460, 462, 464, 466, and the LDPC parity bits 468 for LDPC Codeword 7 from the first memory 110 and attempts to decode LDPC Codeword 7. Because the LDPC Codeword 7 successfully decodes at 315, the method proceeds to 345. At 345, the method determines that there are no LDPC Codewords stored in the first memory 110, and the method proceeds to 340, where the method ends.

In an alternative embodiment, when the LDPC Codeword 6 is uncorrectable, a decision may be made not to store the results of the unsuccessful decoding of LDPC Codeword 6 in the first memory 110, because the results of the unsuccessful decoding of LDPC Codeword 6 may contain more errors than the original LDPC Codeword 6. Storing the results of the unsuccessful decoding of LDPC Codeword 6 may incorrectly adjust the LLRs for the bits of LDPC Codeword 6.

RS LDPC Decoding: Gross Error Decoding

Gross error decoding relies on the fact that a hard decision code used is an erasure code. As the name implies, erasure codes understand the concept of erasures. As such, data going into an erasure decoder, such as RS decoder 125, may take on one of three values, zero (0), one (1), or error (e). Typically, an erasure decoder may correct more erasures than errors. For a RS code, the rule is that a codeword is correctable if and only if:

$$2e+E<=T \quad (2)$$

where e is number of erased inputs, and E is number of erroneous inputs. Thus, for RS codes, T errors or 2T erasures, or some combination thereof, may be corrected. For gross error decoding, the method of the present disclosure takes advantage of the erasure properties of the code.

Figure 8:
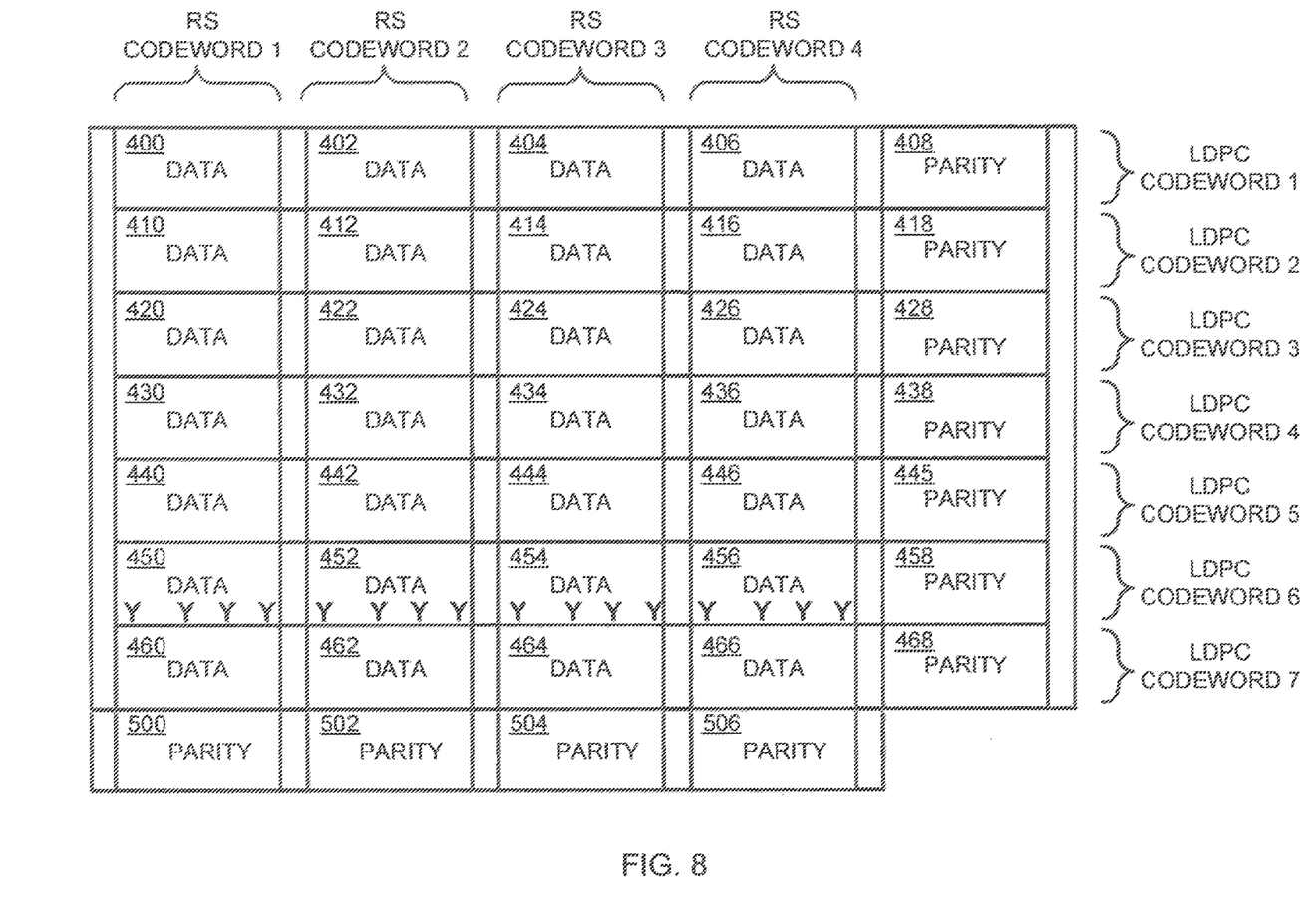
FIG. 8 is a modified version of FIG. 4, in which data encoded by both the set of LDPC Codewords and the set of RS Codewords includes gross errors.

FIG. 8 illustrates a grid similar to that shown in FIG. 4. When the second 115 has gross error, a pattern of errors as shown in FIG. 8 may occur. Each gross error for a bit in LDPC Codeword 6 is illustrated utilizing an uppercase, bolded Y because the exact location of the error is known and is predetermined by a gross error event detection circuit. Because the error locations are known, the errors may be marked as erasures at an input of the RS decoder 125.

As mentioned above, the RS decoder 125 can correct RS codewords that have two or less errors. Based on equation (1), this implies that the same RS codewords are capable of correcting four erasures. Therefore, by marking the errored bits of LDPC Codeword 6 as erased, each errors illustrated by an uppercase and bolded Y may be corrected by decoding RS Codeword 1 through RS Codeword 4 utilizing the method of the present disclosure described herein and shown in FIG. 3.

In an embodiment of the present disclosure, the RS codeword is an erasure codeword and the RS decoder 125 identifies erased data bits in the erasure codeword to determine a location of each error marked as erasure. The RS decoder 125 may also set the LLR to zero for each primary codeword data bit at the locations of the data bits marked as erasures.

Advantageously, the method and system of embodiments of the present disclosure achieve very low uncorrectable bit error rates (UBERs) and ensure good UBER performance even in the event of gross failures. The method and system also obtain good UBER performance with a minimal amount of error correction overhead while ensuring low latency decoding.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure may be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations may also be stored on the machine-readable medium. The instructions stored on the machine-readable medium may be executed by a processor or other suitable processing device, and may interface with circuitry to perform the described tasks.

The above-described embodiments are intended to be examples only. Alterations, modifications, and variations may be effected to the particular embodiments by those of skill in the art without departing from the scope, which is defined solely by the claims appended hereto.

What is claimed is:

1. A method comprising:
    storing, in a first memory, a primary codeword and a set of secondary codewords, the primary codeword comprising primary codeword data bits, each secondary codeword of the set of secondary codewords comprising data bits, wherein the data bits of each secondary codeword are a subset of the primary codeword data bits;
    reading, from the first memory, the primary codeword;
    decoding the primary codeword, utilizing a soft-decision decoder, based on a log-likelihood ratio (LLR) vector comprising a LLR for each primary codeword data bit;
    in response to determining that the decoding of the primary codeword is unsuccessful:
        (i) reading, from the first memory, a secondary codeword of the set of secondary codewords;
        (ii) decoding the secondary codeword, utilizing a hard-decision decoder, to identify and correct errored data bits in the secondary codeword and to determine a location of each errored data bit in the primary codeword;
        (iii) repeating steps (i) and (ii) for all of the secondary codewords in the set of secondary codewords; and
        (iv) generating an adjusted LLR vector by adjusting the LLR for each primary codeword data bit based on the determined locations of the errored data bits in the primary codeword.

2. The method of claim 1, wherein adjusting a LLR for each primary codeword data bit comprises increasing the LLR for each primary codeword data bit at the determined locations of the errored data bits.

3. The method of claim 2, wherein adjusting a LLR for each primary codeword data bit comprises decreasing the LLR for each primary codeword data bit not at the determined locations of the errored data bits.

4. The method of claim 1, further comprising:
    decoding the primary codeword, utilizing the soft-decision decoder, based on the adjusted LLR vector; and
    in response to determining that the decoding of the primary codeword is unsuccessful, repeating steps (i)-(vi) until the decoding of the primary codeword based on the adjusted LLRs is successful or a number of iterations exceeds a predetermined value.

5. The method of claim 1, wherein the primary codeword is a low-density parity-check (LDPC) codeword.

6. The method of claim 1, wherein each secondary codeword in the set of secondary codewords is a Reed-Solomon (RS) codeword.

7. The method of claim 1, wherein each secondary codeword in the set of secondary codewords is an erasure codeword.

8. The method of claim 7, wherein decoding the secondary codeword further comprises decoding the erasure codeword, utilizing the hard-decision decoder, to identify data bits marked as erasures in the erasure codeword and to determine a location of each data bit marked as an erasure in the primary codeword, and wherein generating an adjusted LLR vector further comprises setting the LLR to zero for each primary codeword data bit at the locations the erased data bits.

9. The method of claim 1, further comprising, reading, from a second memory, the second memory being a non-volatile memory, utilizing a second memory reader, the primary codeword and the set of secondary codewords.

10. A non-transitory computer-readable medium comprising computer-readable instructions executable by a processor to perform the method of claim 1.

11. A system comprising:
a first memory storing a primary codeword and a set of secondary codewords, the primary codeword comprising primary codeword data bits, each secondary codeword of the set of secondary codewords comprising data bits, wherein the data bits of each secondary codeword are a subset of the primary codeword data bits; and
a processor operably coupled to the first memory and configured to:
read, from the first memory, the primary codeword;
decode the primary codeword, utilizing a soft-decision decoder, based on a log-likelihood ratio (LLR) vector comprising a LLR for each primary codeword data bit;
in response to a determination that the decoding of the primary codeword is unsuccessful:
(i) read, from the first memory, a secondary codeword of the set of secondary codewords;
(ii) decode the secondary codeword, utilizing a hard-decision decoder, to identify and correct errored data bits in the secondary codeword and to determine a location of each errored data bit in the primary codeword;
(iii) repeat steps (i) and (ii) for all the secondary codewords in the set of secondary codewords; and (iv) generate an adjusted LLR vector by adjusting the LLR for each primary codeword data bit based on the determined locations of the errored data bits in the primary codeword.

12. The system of claim 11, further comprising:
a second memory storing the primary codeword and the set of secondary codewords, the second memory being a non-volatile memory;
a second memory reader operably coupled to the first memory and the second memory, the second memory reader configured to read and store the primary codeword and the set of secondary codewords in the first memory.

13. The system of claim 11, wherein the processor is further configured to increase the LLR for each primary codeword data bit at the determined locations of the errored data bits.

14. The system of claim 13, wherein the processor is further configured to decrease the LLR for each primary codeword data bit not at the determined locations of the errored data bits.

15. The system of claim 12, wherein the processor is further configured to:
decode the primary codeword, utilizing the soft-decision decoder, based on the adjusted LLR vector; and
in response to a determination that the decoding of the primary codeword is unsuccessful, repeat steps (i)-(vi) until the decoding of the primary codeword based on the adjusted LLRs is successful or a number of iterations exceeds a predetermined value.

16. The system of claim 11, wherein the primary codeword is a low-density parity-check (LDPC) codeword.

17. The system of claim 11, wherein each secondary codeword in the set of secondary codewords is a Reed-Solomon (RS) codeword.

18. The system of claim 11, wherein each secondary codeword in the set of secondary codewords is an erasure codeword.

19. The system of claim 18, wherein the processor is further configured to:
decode the erasure codeword, utilizing the hard-decision decoder, to identify erased data bits in the erasure codeword and to determine a location of each erased data bit in the primary codeword; and
set the LLR to zero for each primary codeword data bit at the locations the erased data bits.

* * * * *